UNITED STATES PATENT OFFICE.

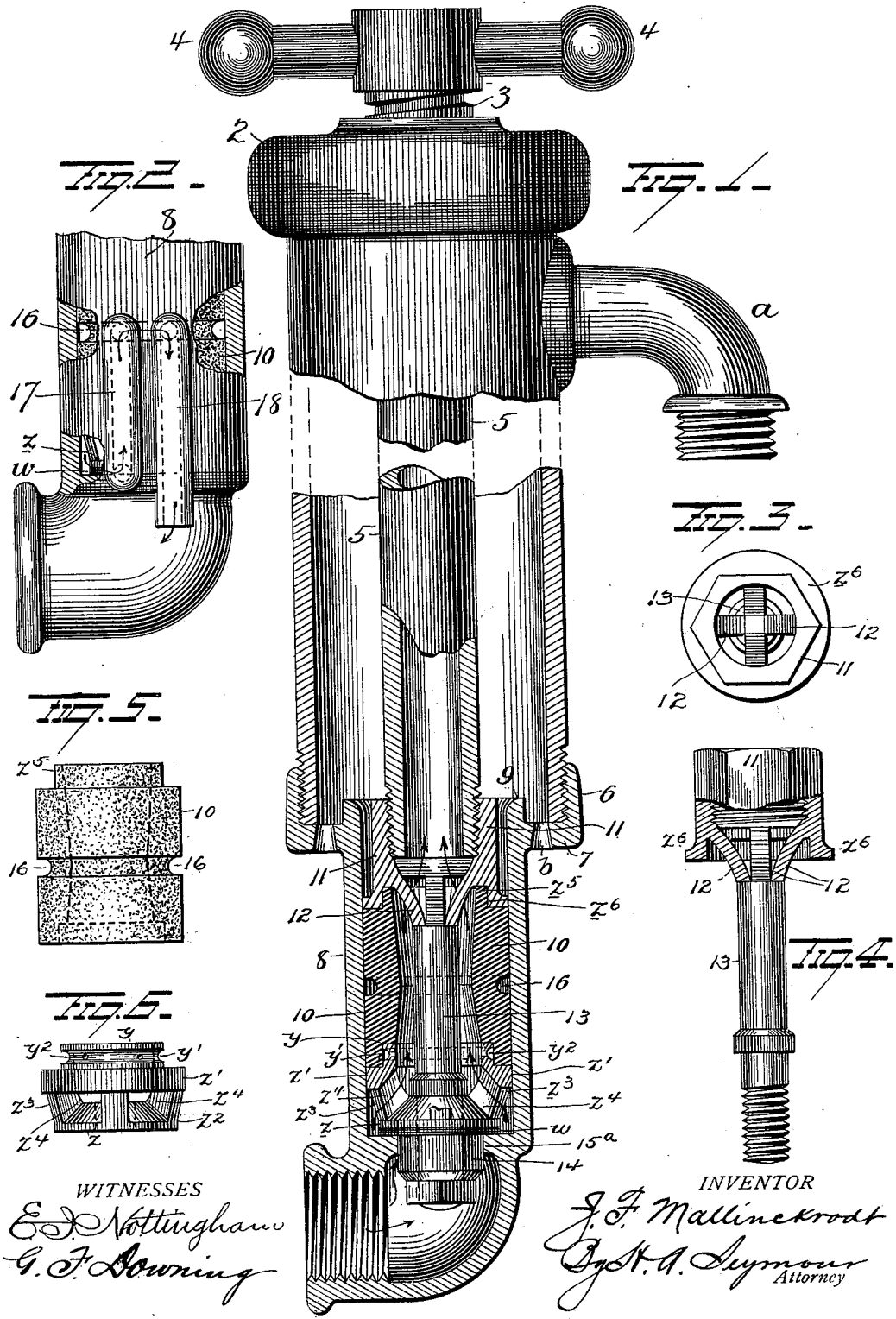

JOHN F. MALLINCKRODT, OF BOULDER, COLORADO, ASSIGNOR OF ONE-HALF TO GEORGE P. SCHUMACKER, OF DENVER, COLORADO.

HYDRANT.

SPECIFICATION forming part of Letters Patent No. 636,909, dated November 14, 1899.

Application filed March 25, 1899. Serial No. 710,495. (No model.)

*To all whom it may concern:*

Be it known that I, JOHN F. MALLINCKRODT, a resident of Boulder, in the county of Boulder and State of Colorado, have invented certain new and useful Improvements in Hydrants; and I do hereby declare the following to be a full, clear, and exact description of the invention, such as will enable others skilled in the art to which it appertains to make and use the same.

My invention relates to an improvement in hydrants, the object of the invention being to construct a valve for a hydrant without cup-leathers and so construct same as to permit water to waste from the stand-pipe only when the supply is entirely cut off.

A further object is to provide a hydrant which will be simple in construction, comparatively cheap to manufacture, and most effectual when in use.

With these objects in view the invention consists in certain novel features of construction and combinations and arrangements of parts, as will be more fully hereinafter described, and pointed out in the claims.

In the accompanying drawings, Figure 1 is a view in section illustrating my improvements. Fig. 2 is a perspective view of a portion of the hydrant, and Figs. 3, 4, 5, and 6 are detail views of the several parts of the valve.

1 represents a cylindrical casing externally screw-threaded at its ends, as shown. The screw-threads on the upper end are adapted to engage internal screw-threads on a suitable cap or cover 2, having a central screw-threaded hole or opening for the reception of a screw 3, on the upper end of which is secured any approved wheel or handhold 4 for turning same. The other end of the screw 3 is revolubly attached to a stand-pipe 5, having any approved nozzle $a$ projecting through a slot provided in the casing 1.

The screw-threads on the lower end of the casing 1 mesh with internal screw-threads of an upturned flange 6 on a ring 7, integral with and disposed around and between the ends of a valve-casing 8. Suitable openings $b$ are provided in said ring 7 to permit the escape of water from the casing. The upper inner edge of the valve-casing 8 is beveled or inclined, as shown at 9, to facilitate the admission of a rubber sleeve 10 and cage 11 for supporting same, which will now be described.

The cage 11 is internally screw-threaded to mesh with external screw-threads on the lower end of the stand-pipe 5, and said cage is made with downwardly-extending arms 12, from which depends a suitable valve-stem 13, of sufficient length to pass entirely through the sleeve 10. The stem 13 is screw-threaded on its lower end to engage screw-threads in a plug or valve 14, which is normally disposed in an opening $15^a$ in the bottom of the valve-casing. Said plug 14 has a square bottom cast upon it to permit the use of a wrench.

The sleeve 10 is composed, preferably, of flexible material made in a single piece and provided at its lower end with an internal recess $x$ to receive a collar $y$ on the upper end of a valve $z$. The valve $z$ comprises upper and lower rings $z'$ and $z^2$ and connecting-arms $z^3$, forming a series of passages $z^4$ for the passage of water therethrough. The upper ring $z'$ is of approximately the size of the internal diameter of the casing, and the collar $y$ is provided with an external groove $y'$ and a series of openings $y^2$, communicating therewith, to permit the water passing through the hydrant to press against the flexible sleeve 10 and insure a water-tight fit of the sleeve. A suitable washer $w$ is secured between the bottom of the valve $z$ and the top of the plug 14 to form a water-tight valve, and said plug constitutes in effect a part of the valve.

To prevent leakage at the top of the sleeve 10, the latter is recessed to form a collar $z^5$, which will be pressed water-tight against a corresponding collar $z^6$ on the cage.

A peripheral groove 16 is provided around the sleeve 10 at a convenient point between its ends, and a suitable channel or passage 17, provided in the valve-casing 8, connects the lower end of the passage or channel 15 with said grooved portion 16 of the sleeve when the valve is on its seat. A channel or passage 18 is provided in the valve-casing 8 for conveying water from said groove 16 to the ground outside of the hydrant, said passages 17 and 18 forming a siphon.

The operation of my improved hydrant is as follows: When it is desired to turn on the supply of water, the wheel or handhold 4 will be turned to raise the stand-pipe 5, nozzle $a$, cage 11, sleeve 10, valve $z$, and plug 14 and permit the water to pass through the hole $15^a$, passages $z^4$, and sleeve 10, (expanding the sleeve 10 against the casing,) through the cage 11 and stand-pipe 5, and out through the nozzle $a$. It will be seen that the lifting of the sleeve 10 will throw the peripheral groove 16 out of alinement with the passages or channels 17 and 18 and that the groove 16 will be moved entirely out of line with said passages before the plug 14 moves far enough to permit water to flow through the hole $15^a$. The discharge of water onto the ground, as is common with the hydrants now in use when the hydrant is only partially turned on, will therefore be effectually prevented. When the hydrant is to be turned off, the wheel or handhold 4 is turned in the opposite direction, which operation will push down the stand-pipe, nozzle, cage, sleeve, valve, and plug and force the plug 14 into the opening $15^a$ and the valve securely onto its seat to completely shut off the supply of water. The water left remaining in the hydrant will flow down through the sleeve, out through the passages $z^4$, up through passage or channel 17, into the grooved chamber 16, and down the passage or channel 18 onto the ground.

Various slight changes might be resorted to in the general form and arrangement of the several parts described without departing from the spirit and scope of my invention, and hence I would have it understood that I do not wish to limit myself to the precise details set forth, but consider myself at liberty to make such slight changes and alterations as fairly fall within the spirit and scope of my invention.

Having fully described my invention, what I claim as new, and desire to secure by Letters Patent, is—

1. In a hydrant, the combination with a valve-casing, of a valve in said casing having passages or channels therein for the passage of water and a siphon coöperating with the channels or passages in said valve to drain the hydrant when said valve is closed.

2. In a hydrant, the combination with a valve-casing, of a valve in said casing having channels therein for the passage of water and said valve also having a part provided with a peripheral groove or chamber, said casing having a channel to connect the channels in said valve with the peripheral groove or chamber and a channel communicating at its upper end with said peripheral chamber and open at its lower end.

3. In a hydrant, the combination of a valve-casing and a valve therein, said valve having channels for the passage of water therethrough, a sleeve on said valve having a peripheral groove around the same, and said valve-casing having a channel connecting the channels in said valve with said groove in the sleeve and another channel in said valve-casing adapted to convey the water from said groove to the outside of said casing, said channels coöperating to form a siphon only when the supply of water is cut off.

4. In a hydrant, the combination with a valve-casing and a valve-seat therein, of a valve having channels for the passage of water, a sleeve on said valve having a peripheral chamber around the same and a siphon in said valve-casing to communicate with said peripheral chamber to drain the hydrant when said valve is closed.

5. In a hydrant, the combination with a valve-casing and a valve-seat therein, of a valve, a sleeve on said valve composed of a single piece of flexible material and having a passage therethrough for the passage of water, said flexible sleeve adapted to be forced tight against the sides of the casing by the water passing therethrough to prevent leakage.

6. In a hydrant, the combination with a valve-casing, of a valve having channels for the passage of water and also having a peripheral groove or chamber, said casing having a siphon for draining the water when the valve is closed, said valve being so constructed as to break said siphon when the valve is opened or partially opened.

7. In a hydrant, the combination with a valve-casing and a valve-seat therein, of a valve in said casing, a sleeve on said valve composed of a single piece of flexible material and having a channel or passage therethrough for the passage of water, a siphon in said casing adapted to drain water from said hydrant when the valve is closed, and a plug or nut secured to said valve and adapted to maintain the water-supply cut off until the siphon is broken.

8. In a hydrant, the combination with a valve-casing and a valve-seat therein, of a valve in said casing comprising upper and lower rings and connecting-arms, a sleeve above said valve having an internal groove, a collar on said valve in said groove in the sleeve, and having a groove therein and perforations communicating therewith.

9. In a hydrant, the combination with a casing, of a valve in said casing, a perforated collar thereon, a sleeve in said casing and a collar on said sleeve inclosing the collar on the valve.

10. In a hydrant, the combination with a casing, of a cage in said casing, a collar on said cage, a flexible sleeve in said casing and a collar on said sleeve disposed in the collar in the cage.

In testimony whereof I have signed this specification in the presence of two subscribing witnesses.

JOHN F. MALLINCKRODT.

Witnesses:
P. W. PLANK,
J. M. EUBANKS.